US012175579B2

(12) United States Patent
Ohashi

(10) Patent No.: US 12,175,579 B2
(45) Date of Patent: Dec. 24, 2024

(54) SKELETON MODEL UPDATE APPARATUS, SKELETON MODEL UPDATE METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 296 days.

(21) Appl. No.: 17/284,832

(22) PCT Filed: Oct. 22, 2018

(86) PCT No.: PCT/JP2018/039189
§ 371 (c)(1),
(2) Date: Apr. 13, 2021

(87) PCT Pub. No.: WO2020/084662
PCT Pub. Date: Apr. 30, 2020

(65) Prior Publication Data
US 2021/0390750 A1 Dec. 16, 2021

(51) Int. Cl.
G06T 13/40 (2011.01)
G06V 40/10 (2022.01)
G06V 40/20 (2022.01)

(52) U.S. Cl.
CPC ............ *G06T 13/40* (2013.01); *G06V 40/103* (2022.01); *G06V 40/23* (2022.01); *G06T 2210/21* (2013.01)

(58) Field of Classification Search
None
See application file for complete search history.

(56) References Cited

U.S. PATENT DOCUMENTS 6,320,988 B1   11/2001  Yamaguchi
2010/0134501 A1*  6/2010  Lowe ............... G06T 13/40
                                                345/473
2018/0122125 A1   5/2018  Brewster

FOREIGN PATENT DOCUMENTS

JP      10208072 A    8/1998
JP    2007334443 A   12/2007

OTHER PUBLICATIONS

Translation JP2007-334443 (Year: 2007).*

(Continued)

Primary Examiner — Peter Hoang
(74) Attorney, Agent, or Firm — Kilpatrick Townsend & Stockton LLP

(57) ABSTRACT

A skeleton model update apparatus, a skeleton model update method, and a program capable of making natural a motion of a skeleton model at a time of occurrence of a collision, compared with an existing technology are provided. An initial position determination section identifies a position to which one or each of a plurality of given nodes included in a skeleton model is to move. A posture update section updates a posture of the skeleton model by executing inverse kinematics computing on the basis of the position to which the one or each of the plurality of given nodes is to move. At a time of occurrence of a collision to one or a plurality of nodes included in the skeleton model, the posture update section updates the posture of the skeleton model by executing the inverse kinematics computing taking into account of an influence of the collision on the one or the plurality of nodes.

8 Claims, 10 Drawing Sheets

(56) References Cited

OTHER PUBLICATIONS

Komura et al.; "Animating reactive motion using momentum-based inverse kinematics;" Sep. 15, 2005; vol. 16, Issue3-4 Special Issue: CASA 2005; pp. 213-223; https://doi.org/10.1002/cav.101 (Year: 2005).*

International Preliminary Report on Patentability and Written Opinion for corresponding PCT Application No. PCT/JP2018/039189, 13 pages, dated May 6, 2021.

International Search Report for corresponding PCT Application No. PCT/JP2018/039189, 2 pages, dated Dec. 18, 2018.

* cited by examiner

SKELETON MODEL UPDATE APPARATUS, SKELETON MODEL UPDATE METHOD, AND PROGRAM

TECHNICAL FIELD

The present invention relates to a skeleton model update apparatus, a skeleton model update method, and a program.

BACKGROUND ART

There is a game where a player object displayed on a screen moves according to a motion of a user to which a plurality of trackers are attached. In such a game, a position to which a given node made to correspond to each of the plurality of trackers attached to the user is to move, for example, is identified on the basis of data indicating postures of the plurality of trackers. A posture of a skeleton model made to correspond to the user is then updated by inverse kinematics (IK) computing on the basis of the position to which the given node is to move. The player object that is according to the skeleton model and that is displayed on the screen is then updated according to update of the posture of the skeleton model.

SUMMARY

Technical Problems

While such a game is being played, a collision sometimes occurs between the player object and the other object such as an obstacle which is, for example, a wall or the other player object. At a time of occurrence of such a collision, it is necessary to update the posture of the skeleton model in consideration of an influence of the collision that occurs.

In an existing technology, however, processing for reflecting the influence of the collision in the posture of the skeleton model either as an alternative to the IK computing or regardless of a result of the IK computing is executed at the time of occurrence of such a collision. This sometimes causes an unnatural motion of the skeleton model.

The update of the posture of the skeleton model made to correspond to the user by the IK computing based on the position to which the given node is to move is also performed in a scene other than the game, for example, a scene for producing an animation. It is sometimes necessary to update the posture of the skeleton model in consideration of the influence of the collision that occurs, as described above, in such a scene other than the game.

The present invention has been achieved in light of the problems, and one object of the present invention is to provide a skeleton model update apparatus, a skeleton model update method, and a program capable of making natural a motion of a skeleton model at a time of occurrence of a collision, compared with an existing technology.

Solution to Problems

To solve the problems, a skeleton model update apparatus according to the present invention includes a position identification section that identifies a position to which one or each of a plurality of given nodes included in a skeleton model is to move, and a posture update section that updates a posture of the skeleton model by executing inverse kinematics computing on a basis of the position to which the one or each of the plurality of given nodes is to move. At a time of occurrence of a collision to one or a plurality of nodes included in the skeleton model, the posture update section updates the posture of the skeleton model by executing the inverse kinematics computing taking into account of an influence of the collision on the one or the plurality of nodes.

According to one aspect of the present invention, the posture update section updates the posture of the skeleton model by executing the inverse kinematics computing on a basis of a position to which the one or each of the plurality of nodes to which the collision occurs is to move according to the influence of the collision.

In this aspect, the posture update section may update the posture of the skeleton model by executing the inverse kinematics computing with the position to which the one or each of the plurality of nodes to which the collision occurs is to move according to the influence of the collision set as an initial position.

Further, according to one aspect of the present invention, the posture update section updates the posture of the skeleton model by executing the inverse kinematics computing divided by the one or each of the plurality of nodes to which the collision occurs.

Further, according to one aspect of the present invention, the posture update section updates the posture of the skeleton model by executing another inverse kinematics computing with the one or each of the plurality of nodes to which the collision occurs set as a root node after updating the posture of the skeleton model by executing the inverse kinematics computing on the basis of the position to which the one or each of the plurality of given nodes is to move.

Further, according to one aspect of the present invention, the posture update section updates the posture of the skeleton model by executing, according to a property of the collision, any of the inverse kinematics computing with the position to which the one or each of the plurality of nodes to which the collision occurs is to move according to the influence of the collision as an initial position, the inverse kinematics computing divided by the one or each of the plurality of nodes to which the collision occurs, and processing that includes update of the posture of the skeleton model by executing the inverse kinematics computing on the basis of the position to which the one or each of the plurality of given nodes is to move and another inverse kinematics computing after the update with the one or each of the plurality of nodes to which the collision occurs set as a root node.

Further, according to one aspect of the present invention, the skeleton model update apparatus further includes a display control section that displays, on a display section, a video picture according to at least one of a position and a direction of a node corresponding to a head of a user and included in the skeleton model after the posture of the skeleton model is updated by executing the inverse kinematics computing taking into account of the influence of the collision on the one or the plurality of nodes to which the collision occurs.

In this aspect, the display control section may display the video picture on a display section of a head mounted display.

Further, a skeleton model update method according to the present invention includes a position identification step of identifying a position to which one or each of a plurality of given nodes included in a skeleton model is to move, and a posture update step of updating a posture of the skeleton model by executing inverse kinematics computing on a basis of the position to which the one or each of the plurality of given nodes is to move. At a time of occurrence of a collision to one or a plurality of nodes included in the skeleton model, the posture of the skeleton model is updated by executing the inverse kinematics computing taking into account of an influence of the collision on the one or the plurality of nodes in the posture update step.

Further, a program causing a computer according to the present invention to execute a position identification procedure of identifying a position to which one or each of a plurality of given nodes included in a skeleton model is to move, and a posture update procedure of updating a posture of the skeleton model by executing inverse kinematics computing on a basis of the position to which the one or each of the plurality of given nodes is to move. At a time of occurrence of a collision to one or a plurality of nodes included in the skeleton model, the posture of the skeleton model is updated by executing the inverse kinematics computing taking into account of an influence of the collision on the one or the plurality of nodes in the posture update procedure.

DESCRIPTION OF EMBODIMENT

Figure 1:
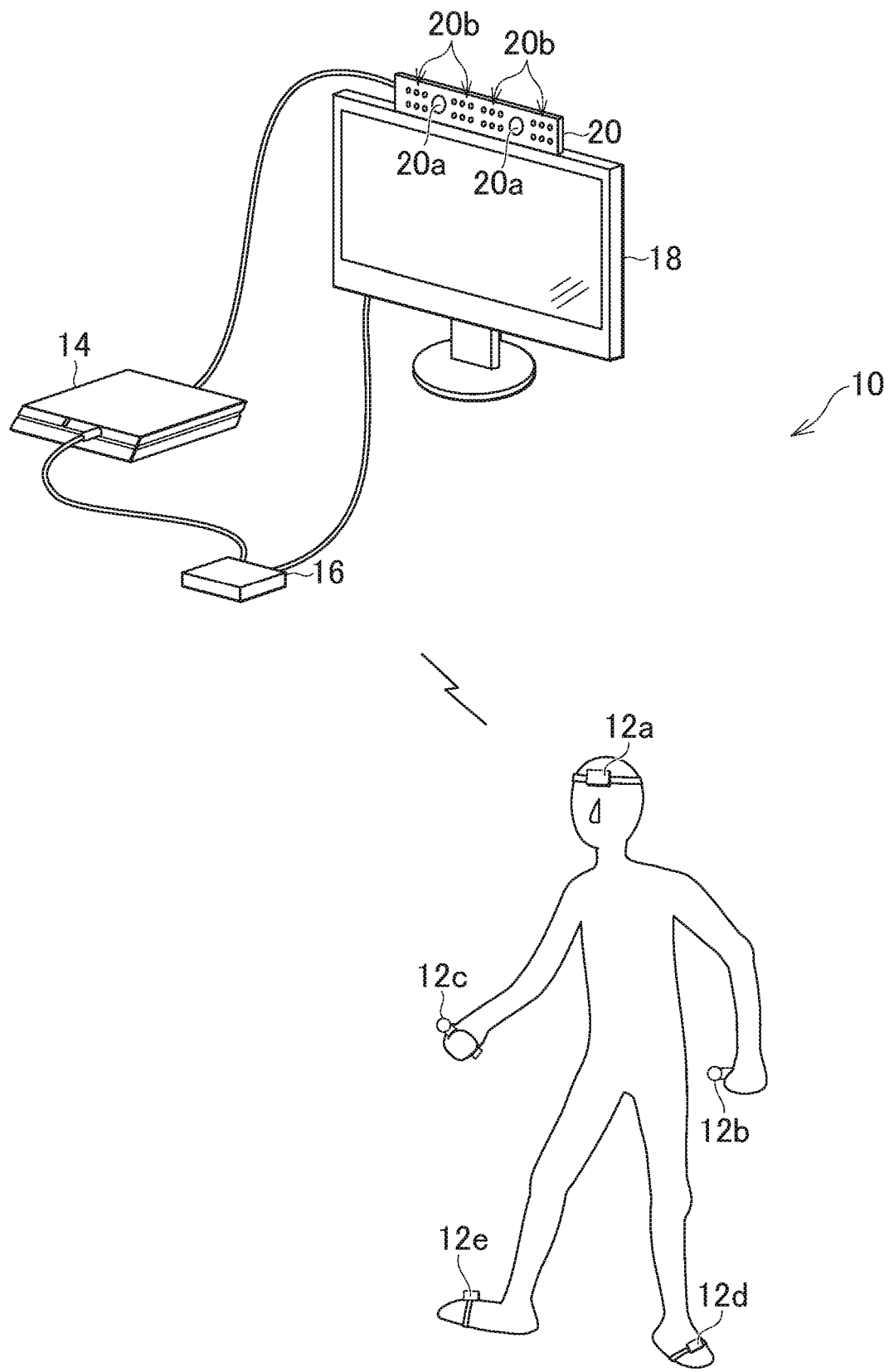
FIG. 1 is a configuration diagram depicting an example of an entertainment system according to an embodiment of the present invention.
Figure 2:
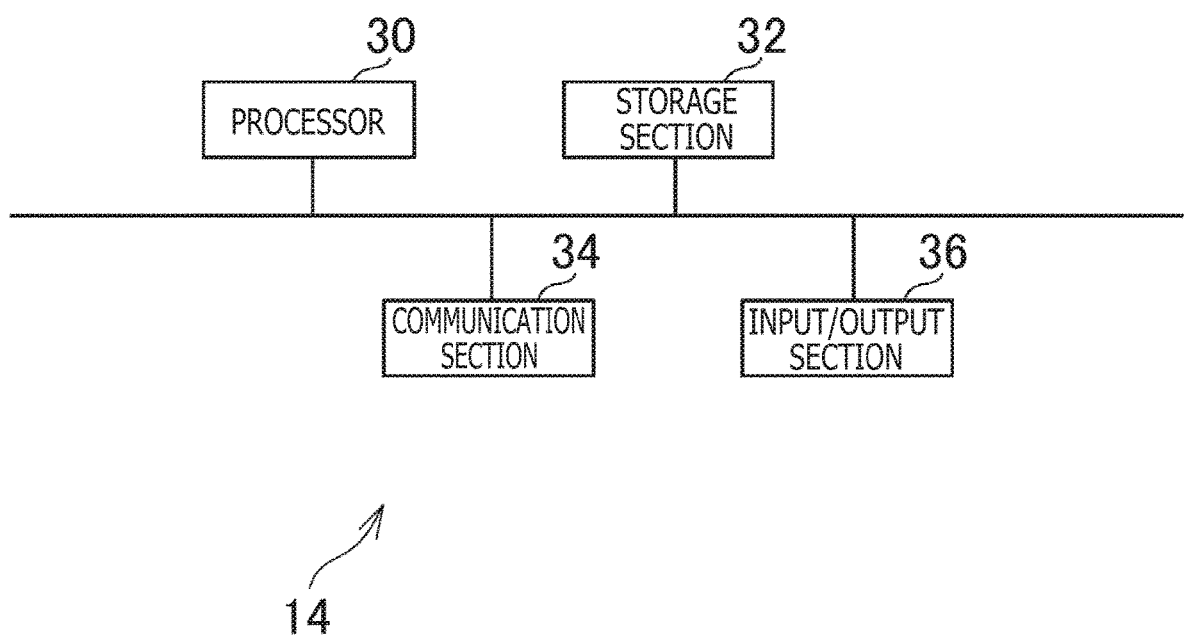
FIG. 2 is a configuration diagram depicting an example of an entertainment apparatus according to the embodiment of the present invention.

FIG. 1 is a diagram depicting an example of configurations of an entertainment system 10 according to an embodiment of the present invention. FIG. 2 is a diagram depicting an example of configurations of an entertainment apparatus 14 according to the present embodiment.

As depicted in FIG. 1, the entertainment system 10 according to the present embodiment includes a plurality of trackers 12 (trackers 12a to 12e in the example of FIG. 1), the entertainment apparatus 14, a relay apparatus 16, a display 18, and a camera microphone unit 20.

The trackers 12 according to the present embodiment are devices that, for example, track positions and directions of the trackers 12. Each of the trackers 12 may be configured here with, for example, various sensors such as a camera, an inertial measurement unit (IMU), a geomagnetic sensor (azimuth sensor), an acceleration sensor, a motion sensor, and a GPS (Global Positioning System) module. In addition, each of the trackers 12 may identify the posture of the tracker 12 on the basis of sensing data that is measurement results by the sensors provided in the tracker 12.

Alternatively, each of the trackers 12 may identify the posture of the tracker 12 on the basis of, for example, an image captured by a camera 20a included in the camera microphone unit 20, to be described later, and containing an image of the tracker 12.

In the present embodiment, the trackers 12a, 12b, 12c, 12d, and 12e are attached to a head, a left hand, a right hand, a left foot, and a right foot of a user, respectively. As depicted in FIG. 1, the trackers 12b and 12c may be here grasped by user's hands. In the present embodiment, postures identified by the trackers 12a, 12b, 12c, 12d, and 12e correspond to postures of the head, the left hand, the right hand, the left foot, and the right foot of the user, respectively. In this way, in the present embodiment, the plurality of trackers 12 identify the postures of a plurality of regions included in a user's body.

Examples of the entertainment apparatus 14 according to the present embodiment include computers such as a game console, a DVD (Digital Versatile Disc) player, a Blu-ray (registered trademark) player. The entertainment apparatus 14 according to the present embodiment generates a video picture and a sound by, for example, execution of a game program or reproduction of a content stored or recorded in an optical disk. The entertainment apparatus 14 according to the present embodiment then outputs a video picture signal representing the generated video picture and an audio signal representing the generated sound to the display 18 via the relay apparatus 16.

As depicted in, for example, FIG. 2, the entertainment apparatus 14 according to the present embodiment includes a processor 30, a storage section 32, a communication section 34, and an input/output section 36.

The processor 30 is a program control device such as a CPU (Central Processing Unit) operating in accordance with, for example, a program installed in the entertainment apparatus 14. The processor 30 according to the present embodiment also includes a GPU (Graphics Processing Unit) that draws an image on a frame buffer on the basis of a graphics command and data supplied from the CPU.

The storage section 32 is, for example, storage elements such as a ROM (Read-Only Memory) and a RAM (Random Access Memory) or a hard disk drive. A program and the like executed by the processor 30 are stored in the storage section 32. Further, an area of the frame buffer where an image is drawn by the GPU is allocated in the storage section 32 according to the present embodiment.

The communication section 34 is, for example, a communication interface such as a wireless LAN (Local Area Network) module.

The input/output section 36 is an input/output port such as an HDMI (registered trademark) (High-Definition Multimedia Interface) port or a USB (Universal Serial Bus) port.

The relay apparatus 16 according to the present embodiment is a computer that relays the video picture signal and the audio signal output from the entertainment apparatus 14 and that outputs the video picture signal and the audio signal to the display 18.

The display 18 according to the present embodiment is, for example, a liquid crystal display, and displays thereon the video picture represented by the video picture signal output from the entertainment apparatus 14.

The camera microphone unit 20 according to the present embodiment includes, for example, the camera 20a that outputs an image obtained by imaging a subject to the entertainment apparatus 14, and a microphone 20b that acquires a surrounding sound, converts the sound into audio data, and outputs the audio data to the entertainment apparatus 14. Further, the camera 20a according to the present embodiment is a stereo camera.

The trackers 12 and the relay apparatus 16 are configured to be capable of mutually transmitting and receiving data by, for example, wireless communication. The entertainment apparatus 14 and the relay apparatus 16 are connected to each other via, for example, an HDMI cable or a USB cable, and configured to be capable of mutually transmitting and receiving data. The relay apparatus 16 and the display 18 are connected to each other via, for example, an HDMI cable. The entertainment apparatus 14 and the camera microphone unit 20 are connected to each other via, for example, an AUX (Auxiliary) cable.

Figure 3:
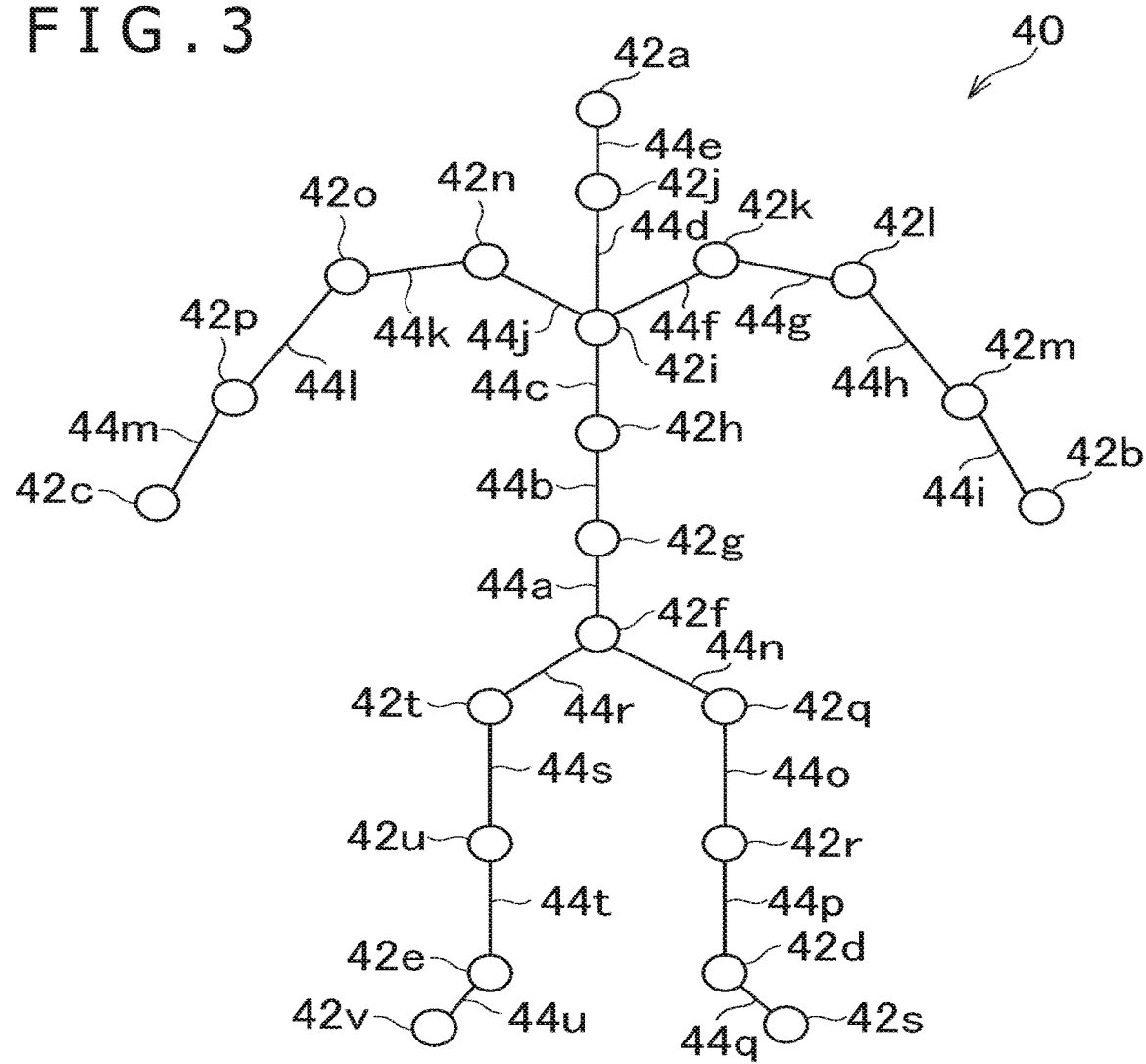
FIG. 3 is a diagram depicting an example of a skeleton model.

In the present embodiment, at a time of, for example, executing a game program by the entertainment apparatus 14, various types of processing such as game processing according to postures of the plurality of regions included in the user's body in a skeleton model 40 depicted in FIG. 3 are executed. A video picture according to a result of the processing is then displayed on, for example, the display 18. For example, a video picture of a polygon model of a player object according to a posture of the skeleton model 40 is displayed on the display 18.

As depicted in FIG. 3, the skeleton model 40 according to the present embodiment includes a head node 42a, a left hand node 42b, a right hand node 42c, a left foot node 42d, and a right foot node 42e. The head node 42a corresponds to the user's head to which the tracker 12a is attached. The left hand node 42b corresponds to the user's left hand to which the tracker 12b is attached. The right hand node 42c corresponds to the user's right hand to which the tracker 12c is attached. The left foot node 42d corresponds to the user's left foot to which the tracker 12d is attached. The right foot node 42e corresponds to the user's right foot to which the tracker 12e is attached.

The skeleton model 40 also includes a pelvis node 42f, a first spine node 42g, a second spine node 42h, a third spine node 42i, and a neck node 42j, in addition to the nodes 42 described above. In the present embodiment, the pelvis node 42f, for example, plays a role as a root node in the overall skeleton model 40.

Further, the skeleton model 40 also includes a left clavicle node 42k, a left upper arm node 42l, a left front arm node 42m, a right clavicle node 42n, a right upper arm node 42o, and a right front arm node 42p.

Further, the skeleton model 40 also includes a left femoral region node 42q, a left calf node 42r, a left thenar node 42s, a right femoral region node 42t, a right calf node 42u, and a right thenar node 42v.

As depicted in FIG. 3, the pelvis node 42f is connected to the first spine node 42g by a bone 44a. Further, the first spine node 42g is connected to the second spine node 42h by a bone 44b. Further, the second spine node 42h is connected to the third spine node 42i by a bone 44c. Further, the third spine node 42i is connected to the neck node 42j by a bone 44d. Further, the neck node 42j is connected to the head node 42a by a bone 44e.

Further, the third spine node 42i is connected to the left clavicle node 42k by a bone 44f. Further, the left clavicle node 42k is connected to the left upper arm node 42l by a bone 44g. Further, the left upper arm node 42l is connected to the left front arm node 42m by a bone 44h. Further, the left front arm node 42m is connected to the left hand node 42b by a bone 44i.

Further, the third spine node 42i is connected to the right clavicle node 42n by a bone 44j. Further, the right clavicle node 42n is connected to the right upper arm node 42o by a bone 44k. Further, the right upper arm node 42o is connected to the right front arm node 42p by a bone 44l. Further, the right front arm node 42p is connected to the right hand node 42c by a bone 44m.

Further, the pelvis node 42f is connected to the left femoral region node 42q by a bone 44n. Further, the left femoral region node 42q is connected to the left calf node 42r by a bone 44o. Further, the left calf node 42r is connected to the left foot node 42d by a bone 44p. Further, the left foot node 42d is connected to the left thenar node 42s by a bone 44q.

Further, the pelvis node 42f is connected to the right femoral region node 42t by a bone 44r. Further, the right femoral region node 42t is connected to the right calf node 42u by a bone 44s. Further, the right calf node 42u is connected to the right foot node 42e by a bone 44t. Further, the right foot node 42e is connected to the right thenar node 42v by a bone 44u.

FIG. 3 depicts the skeleton model 40 in a basic posture (here, what is generally called an A pose posture with feet are open and the arms are obliquely down) that is the skeleton model 40 in an initial state.

In addition, in the present embodiment, body tracking, for example, based on the postures identified by the plurality of trackers 12 can be performed. Determination of a position relative to a reference position in the initial state and a direction relative to a reference direction in the initial state, for example, is executed here for each of the plurality of nodes 42 included in the skeleton model 40. In addition, determination of a direction relative to a reference direction in the initial state is executed for each of a plurality of bones 44 included in the skeleton model 40.

A posture of the head node 42a, for example, can be determined here on the basis of data indicating a posture identified for the tracker 12a. Likewise, a posture of the left hand node 42b can be determined on the basis of data indicating a posture identified for the tracker 12b. Further, a posture of the right hand node 42c can be determined on the basis of data indicating a posture identified for the tracker 12c. Further, a posture of the left foot node 42d can be determined on the basis of data indicating a posture identified for the tracker 12d. Further, a posture of the right foot node 42e can be determined on the basis of data indicating a posture identified for the tracker 12e.

Further, a posture of the pelvis node 42f can be similarly determined on the basis of, for example, the determined posture of the head node 42a. Estimation of the posture of the pelvis node 42f by using a learned machine learning model may be executed here on the basis of, for example, the postures identified for the trackers 12a to 12e. Likewise, a posture of the third spine node 42i can also be determined.

It is then considered to determine positions and directions of the remaining nodes 42 and directions of the bones 44 by Forward and Backward Reaching Inverse Kinematics (FABRIK) computing on the basis of determination results and estimation results so far. For example, the head node 42a, the left hand node 42b, the right hand node 42c, the left foot node 42d, and the right foot node 42e correspond here to effectors in the FABRIK. The positions and the directions of the nodes 42 and the directions of the bones 44 included in the skeleton model 40 are then determined according to motions of the effectors.

Figure 4:
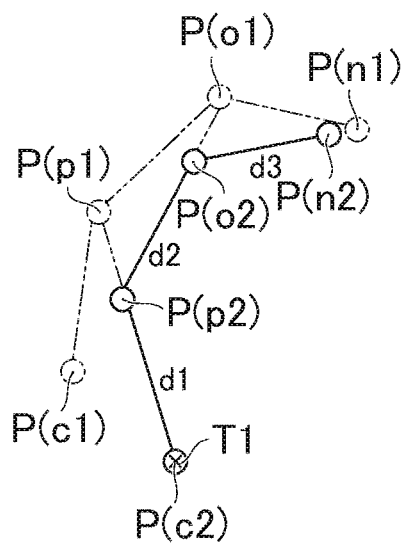
FIG. 4 is a diagram schematically depicting an example of a forward reaching phase in FABRIK computing.
Figure 5:
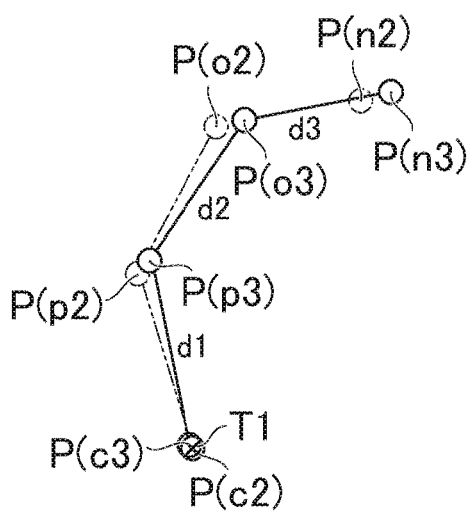
FIG. 5 is a diagram schematically depicting an example of a backward reaching phase in FABRIK computing.

FIGS. 4 and 5 are diagrams schematically depicting an example of FABRIK computing. By way of example, FIGS. 4 and 5 depict the FABRIK computing executed for the right hand node 42c, the right clavicle node 42n, the right upper arm node 42o, and the right front arm node 42p.

In FIG. 4, current positions of the right hand node 42c, the right clavicle node 42n, the right upper arm node 42o, and the right front arm node 42p in the skeleton model 40 are denoted as P(c1), P(n1), P(o1), and P(p1), respectively. It is also assumed that lengths of the bones 44m, 44l, 44k, and 44j are d1, d2, and d3, respectively.

It is assumed that the position T1 to which the right hand node 42c is to move is identified on the basis of a measurement result of the tracker 12c under these circumstances.

A forward reaching phase in the FABRIK computing will be described hereinafter with reference to FIG. 4.

In the forward reaching phase, the right hand node 42c moves first to the position T1. In FIG. 4, a position of the right hand node 42c after movement is denoted as P(c2). The right front arm node 42p then moves to the position P(p2) apart from the position P(c2) by the length d1 in the direction from the position P(c2) to the position P(p1). The right upper arm node 42o then moves to the position P(o2) apart from the position P(p2) by the length d2 in the direction from the position P(p2) to the position P(o1). The right clavicle node 42n then moves to the position P(n2) apart from the position P(o2) by the length d3 in the direction from the position P(o2) to the position P(n1).

In this way, the forward reaching phase processing in the FABRIK computing includes determination of a new position of a parent node 42 of each node 42 based on the position to which the node 42 made to correspond to each tracker 12 is to move and the current position of the parent node 42. Further, the determination is executed on condition that the length between each node 42 made to correspond to one tracker 12 and the parent node 42 of the node 42 is kept constant. The node 42 made to correspond to the tracker 12 will be referred to as "target node," hereinafter.

A backward reaching phase in the FABRIK computing will be described hereinafter with reference to FIG. 5.

First, the right clavicle node 42n moves from the position P(n2) to the position P(n3). The position P(n3) depicted in FIG. 5 is here the same position as the position P(n1) of the right clavicle node 42n at a time of starting the FABRIK computing. The right upper arm node 42o then moves to the position P(o3) apart from the position P(n3) by the length d3 in the direction from the position P(n3) to the position P(o2). The right front arm node 42p then moves to the position P(p3) apart from the position P(o3) by the length d2 in the direction from the position P(o3) to the position P(p2). The right hand node 42c then moves to the position P(c3) apart from the position P(p3) by the length dl in the direction from the position P(p3) to the position P(c2).

The forward reaching phase and the backward reaching phase are repeatedly executed until the length between the position of the right hand node 42c and the position T1 is equal to or smaller than the predetermined threshold. It is noted that the FABRIK computing is ended when the forward reaching phase and the backward reaching phase are repeatedly executed a predetermined number of times (for example, ten times) even if the length between the position of the right hand node 42c and the position T1 is not equal to or smaller than the predetermined threshold.

In this way, the posture of the skeleton model 40 is determined by a simple algorithm in the FABRIK computing. As a result, however, joints are not bent in natural directions and the posture of the skeleton model 40 which is impossible as that of the human body is sometimes determined.

Further, in the case of determining the posture in the FABRIK computing, information regarding a rotation of each hand about an axis in the arm direction is not reflected in a rotation of each elbow about an axis in the arm direction although this information can be acquired from trackers 12b and 12c.

Further, in the FABRIK computing performed on the skeleton model 40 of the tree structure, it is necessary to execute independent forward reaching phase processing on a node group that contains a plurality of target nodes with each of the plurality of target nodes used as a starting point. Owing to this, the forward reaching phase processing sometimes causes overall postures of a plurality of nodes, for example, from the chest to the shoulders in the vicinity of junctions of the skeleton model 40 of the tree structure to get greatly distorted although the overall postures are not supposed to get greatly distorted.

As described so far, a result with low adequacy is sometimes obtained in the determination of the posture of the skeleton model 40 by using the FABRIK computing.

Taking these respects into account, the present embodiment is designed to be capable of improving the adequacy of the determination result of the posture of the skeleton model 40 by using the FABRIK computing as follows.

Functions of the entertainment apparatus 14 according to the present embodiment and processing executed in the entertainment apparatus 14 according to the present embodiment will be further described, hereinafter.

Figure 6:
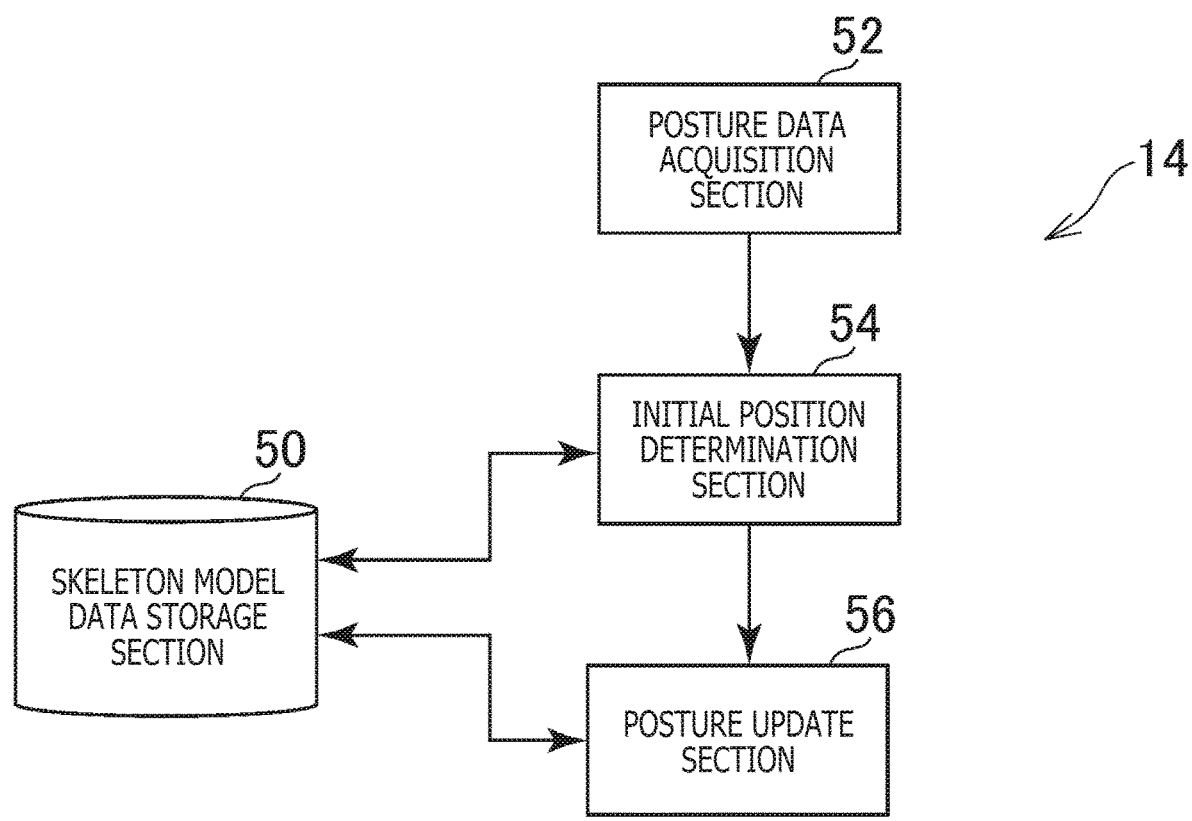
FIG. 6 is a functional block diagram depicting an example of functions implemented by the entertainment apparatus according to the embodiment of the present invention.

FIG. 6 is a functional block diagram depicting an example of functions of the entertainment apparatus 14 according to the present embodiment. It is noted that the entertainment apparatus 14 according to the present embodiment does not necessarily implement therein all functions depicted in FIG. 6 and may implement therein functions other than those depicted in FIG. 6.

As depicted in FIG. 6, the entertainment apparatus 14 according to the present embodiment functionally includes a skeleton model data storage section 50, a posture data acquisition section 52, an initial position determination section 54, and a posture update section 56.

The skeleton model data storage section 50 is implemented mainly in the storage section 32. The posture data acquisition section 52 is implemented mainly in the processor 30 and the input/output section 36. The initial position determination section 54 and the posture update section 56 are implemented mainly in the processor 30.

The functions described above may be implemented by causing the processor 30 to execute a program that is installed into the entertainment apparatus 14, which is a computer, and that includes commands corresponding to the functions described above. This program may be supplied to the entertainment apparatus 14, for example, via a computer readable information storage medium such as an optical disk, a magnetic disk, a magnetic tape, a magneto-optical disk, or a flash memory, or via the Internet.

The skeleton model data storage section 50 stores, for example, skeleton model data indicating the posture of the skeleton model 40 in the present embodiment. The skeleton model data may contain, for example, data indicating positions of the plurality of nodes 42, individually. The skeleton model data may also contain data indicating directions of the nodes 42. The data indicating the directions may be here, for example, data indicating rotation amounts in three axial directions, individually. The skeleton model data may also contain data indicating positions and directions of the bones 44. The positions and directions of the bones 44 are uniquely determined on the basis of positions of the nodes 42 on two ends of each of the bones 44.

It is also assumed in the present embodiment that the skeleton model data storage section 50 stores skeleton model data indicating a latest posture of the skeleton model 40. In addition, it is assumed that the skeleton model data storage section 50 also stores skeleton model data indicating a posture of the skeleton model 40 assuming a basic posture such as an A-pose in the initial state.

The posture data acquisition section 52 acquires, for example, posture data indicating the positions and the directions of the trackers 12a to 12e identified at a predetermined sampling rate in the present embodiment. For example, the trackers 12 may generate here, for example, the posture data indicating the positions and the directions of the trackers 12 at the predetermined sampling rate. The trackers 12 may then transmit the posture data generated by the trackers 12 to the entertainment apparatus 14 via the relay apparatus 16 according to the generation. Alternatively, the camera microphone unit 20 may generate for example, the posture data indicating the positions and the directions of the trackers 12a to 12e at the predetermined sampling rate. The camera microphone unit 20 may then transmit the posture data generated by the camera microphone unit 20 to the entertainment apparatus 14 according to the generation.

The initial position determination section 54 determines, for example, initial positions of some of the nodes 42 on the basis of the posture data acquired by the posture data acquisition section 52 in the present embodiment.

The posture update section 56 updates, for example, the posture of the skeleton model 40 in the present embodiment. The posture update section 56 updates here, for example, the skeleton model data stored in the skeleton model data storage section 50. The posture update section 56 may update the posture of the skeleton model 40 by the Forward and Backward Reaching Inverse Kinematics (FABRIK) computing on the basis of the posture data acquired by the posture data acquisition section 52 and the initial positions determined by the initial position determination section 54.

Figure 7:
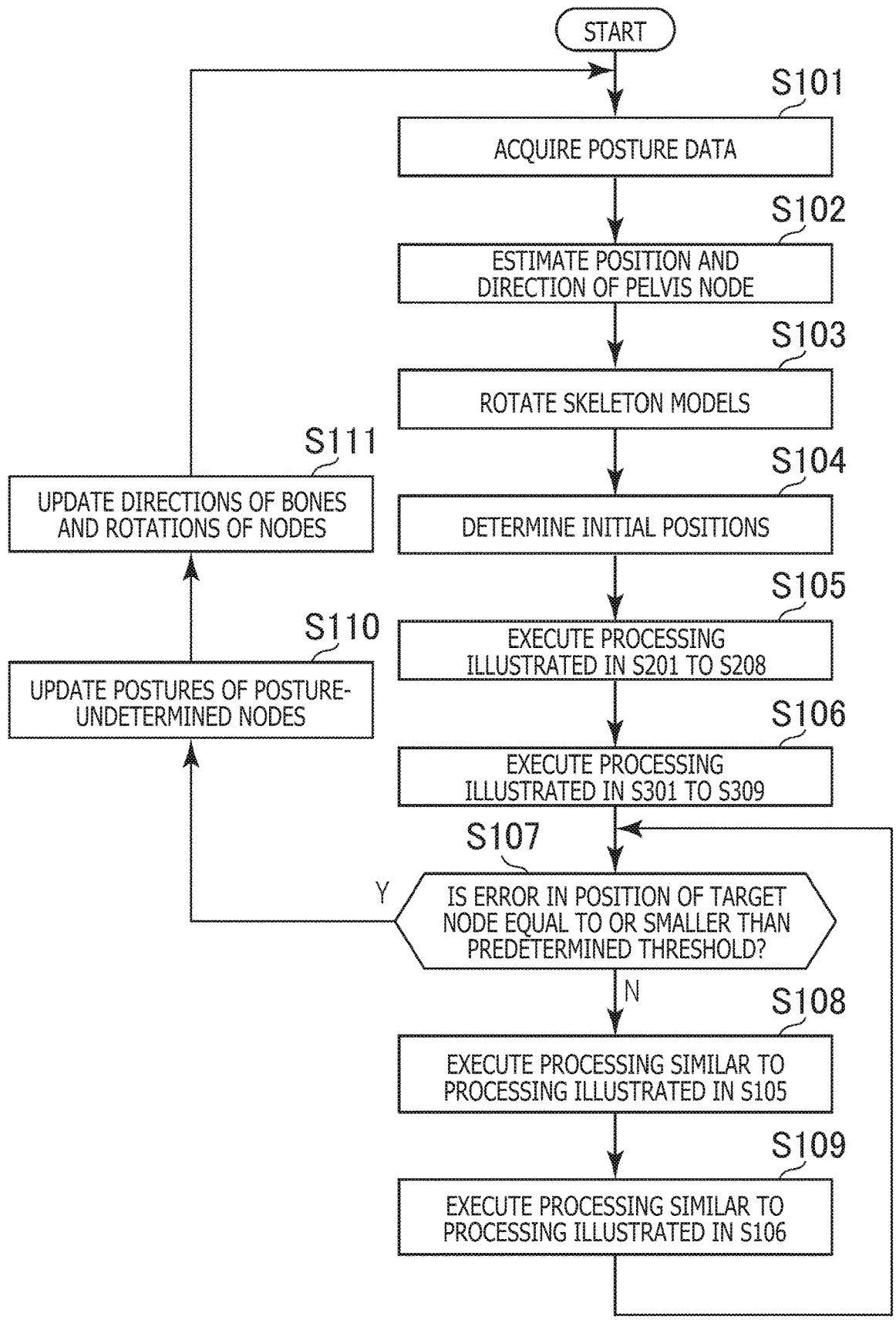
FIG. 7 is a flowchart depicting an example of a flow of processing performed by the entertainment apparatus according to the embodiment of the present invention.

An example of a flow of processing performed by the entertainment apparatus 14 according to the present embodiment will now be described with reference to a flowchart illustrated in FIG. 7.

First, the posture data acquisition section 52 acquires posture data generated by each tracker 12 and indicating the position and the direction of the tracker 12 at the latest specific timing (S101). The posture data acquisition section 52 acquires here, for example, the posture data indicating the position and the direction of each of the trackers 12 regarding each of the trackers 12a to 12e.

The posture update section 56 then estimates a position and a direction of the pelvis node 42f on the basis of the posture data acquired in the processing illustrated in S101 (S102). The posture update section 56 may estimate here, for example, a position and a direction of the third spine node 42i as an alternative to the position and the direction of the pelvis node 42f. In another alternative, the posture update section 56 may estimate, for example, the positions and the directions of the pelvis node 42f and the third spine node 42i.

The posture update section 56 then updates skeleton model data on the basis of an estimation result of the processing illustrated in S102 (S103). In the processing illustrated in S103, the posture update section 56 executes, for example, processing for rotating the latest skeleton model 40 and the skeleton model 40 in the initial state.

The initial position determination section 54 then determines initial positions of part of the nodes 42 included in the skeleton model 40 (S104).

Figure 8:
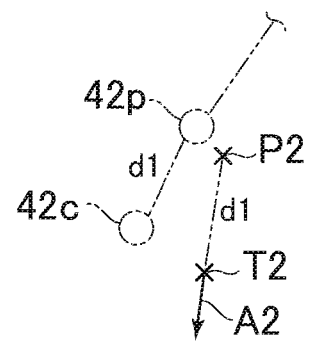
FIG. 8 is an explanatory diagram of an example of determination of an initial position of a node.

As depicted in, for example, FIG. 8, a position T2 to which the right hand node 42c that is the target node is to move and a direction A2 in which the right hand node 42c is to be directed are identified here on the basis of the position of the tracker 12c indicated by the posture data acquired in the processing illustrated in S101. A position P2 apart from the position T2 by the length d1 along the direction A2 in an opposite direction to the direction A2 is then determined as the initial position of the right front arm node 42p that is a parent node 42 of the right hand node 42c. The length d1 is here the length of the bone 44m as described above.

It is noted here that a position obtained by interpolating a current position and the position P2 of the right front arm node 42p with a predetermined weight may be determined as the initial position of the right front arm node 42p.

Further, the weight may be determined on the basis of a length, between the current position of the right hand node 42c and the position T2, made to correspond to a speed of the tracker 12c. For example, a position closer to the current position of the right front arm node 42p may be determined as the initial position of the right front arm node 42p as the length between the current position of the right hand node 42c and the position T2 is smaller. By doing so, it is possible to avoid a situation in which an elbow of a player object greatly moves in a case of, for example, player's rotating only a wrist.

Figure 9:
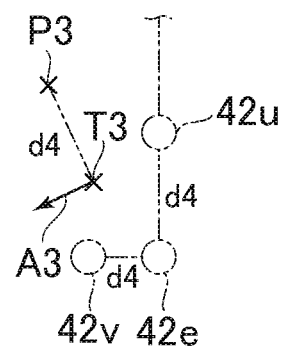
FIG. 9 is an explanatory diagram of an example of determination of an initial position of a node.

Further, as depicted in FIG. 9, a position T3 to which the right foot node 42e that is the target node is to move and a direction A3 in which the right foot node 42e is to be directed, for example, are identified on the basis of the position of the tracker 12e indicated by the posture data acquired in the processing depicted in S101. A position P3 apart from the position T3 by a length d4 in a direction rotated by a predetermined angle (for example, 90 degrees) about an axis in a transverse direction with the direction A3 set as a reference direction is then determined as an initial position of the right calf node 42u that is a parent node 42 of the right foot node 42e. The length d4 is here a length of the bone 44t.

It is noted that a position obtained by interpolating a current position of the right calf node 42u and the position P3 may be determined as the initial position of the right calf node 42u in a similar manner as that of the example described above.

Likewise, initial positions of the other nodes 42 such as the left front arm node 42m and the left calf node 42r, for example, are then determined.

Figure 10:
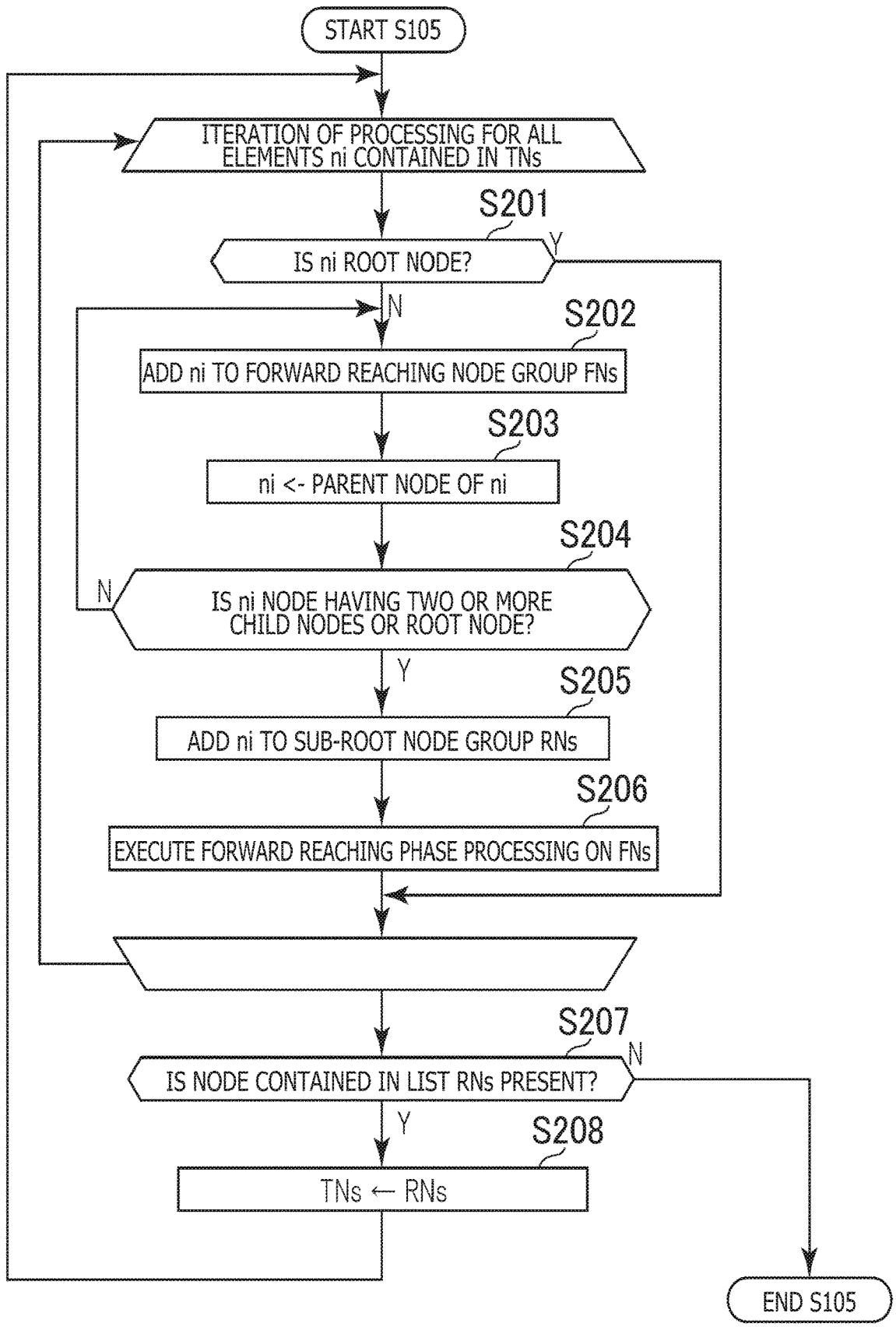
FIG. 10 is a flowchart depicting an example of a flow of processing performed by the entertainment apparatus according to the embodiment of the present invention.

The posture update section 56 then executes processing illustrated in S201 to S208 of FIG. 10 with a list of the head node 42a, the left hand node 42b, the right hand node 42c, the left foot node 42d, and the right foot node 42e as argument TNs (S105).

In the processing illustrated in S105 with the list TNs of the nodes 42 as the arguments, processing illustrated in S201 to S206 to be described hereinafter is repeatedly executed on each of all elements ni contained in the TNs.

First, the posture update section 56 confirms whether or not the ni is the root node (pelvis node 42o (S201). In a case in which the ni is the root node (S201: Y), the posture update section 56 exits from a loop of the processing illustrated in S201 to S206.

In a case in which the ni is not the root node (S201: N), the posture update section 56 adds the ni to a list FNs representing a forward reaching node group in a current loop of the processing illustrated in S201 to S206 (S202).

The posture update section 56 then updates the ni to a parent node 42 of the ni (S203).

The posture update section 56 then confirms whether or not the ni is the node 42 having two or more child nodes 42 or the pelvis node 42f that is the root node (S204).

In a case in which the ni is neither the node 42 having two or more child nodes 42 nor the root node (S204: N), the posture update section 56 returns to the processing illustrated in S202.

In a case in which the ni is the node 42 having two or more child nodes 42 or the root node (S205: Y), the posture update section 56 adds the ni to a list RNs representing a sub-root node group (S205).

The posture update section 56 then executes forward reaching phase processing of the FABRIK described with respect to FIG. 4 on each of the nodes 42 contained in the FNs (S206).

When being completed with execution of the processing illustrated in S201 to S206 on all the elements ni contained in the TNs, the posture update section 56 confirms whether or not a node 42 contained in the list RNs is present (S207).

In a case in which the node 42 contained in the list RNs is present (S207: Y), the posture update section 56 sets the list RNs to a list TNs in a next loop (S208) and returns to the processing illustrated in S201. In this case, at a next time of executing the processing illustrated in S202, the posture update section 56 adds the ni to the new list FNs.

In a case in which it is confirmed that the node 42 contained in the list RNs is not present in the processing illustrated in S207 (S207: N), the processing illustrated in S105 is ended.

As for the skeleton model 40 depicted in FIG. 3, five lists FNs each representing the forward reaching node group are generated in the initial loop of the processing illustrated in S201 to S208 by the processing described so far. The first FNs contains, for example, the head node 42a and the neck node 42j. The second FNs contains, for example, the left hand node 42b, the left front arm node 42m, the left upper arm node 42l, and the left clavicle node 42k. The third FNs contains, for example, the right hand node 42c, the right front arm node 42p, the right upper arm node 42o, and the right clavicle node 42n. The fourth FNs contains, for example, the left foot node 42d, the left calf node 42r, and the left femoral region node 42q. The fifth FNs contains, for example, the right foot node 42e, the right calf node 42u, and the right femoral region node 42t.

In addition, the list RNs representing the sub-root node group in the initial loop of the processing illustrated in S201 to S208 contains the pelvis node 42f that is the root node and the third spine node 42i. These nodes 42 are the nodes 42 as junctions in the skeleton model 40.

Further, one list FNs representing the forward reaching node group is generated in a second loop of the processing illustrated in S201 to S208. The list FNs contains the pelvis node 42f, the first spine node 42g, the second spine node 42h, and the third spine node 42i. In addition, the list RNs representing the sub-root node group is empty in the second loop of the processing illustrated in S201 to S208.

Figure 11:
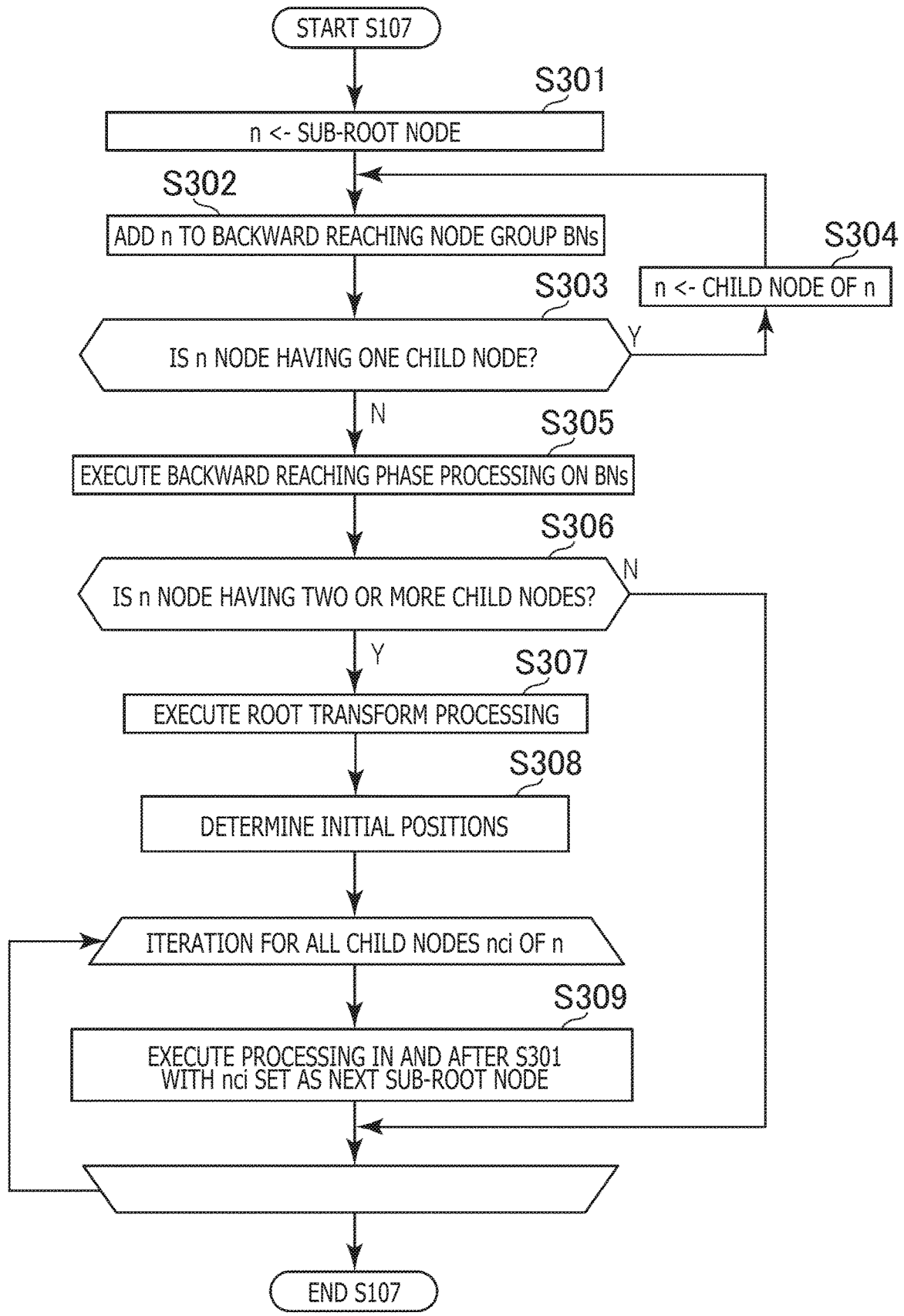
FIG. 11 is a flowchart depicting an example of a flow of processing performed by the entertainment apparatus according to the embodiment of the present invention.

When the processing illustrated in S105 is ended, the posture update section 56 executes processing illustrated in S301 to S309 of FIG. 11 (S106).

In the processing illustrated in S106, the processing illustrated in S301 to S309 is executed with all the nodes 42 (sub-root nodes) contained in the list RNs in the initial loop of the processing illustrated in S201 to S208 as arguments. In the case here in which the number of nodes 42 contained in the RNs is two as described above, the processing illustrated in S301 to S309 is executed twice. It is noted that the processing illustrated in S301 to S309 is executed on each of the nodes 42 on which the processing illustrated in S105 is executed. For that reason, the processing illustrated in S301 to S309 is executed on the assumption that the skeleton model 40 does not include the left thenar node 42s and the right thenar node 42v.

First, the posture update section 56 sets the sub-root node that is the argument to an element n (S301).

The posture update section 56 then adds the n to a list BNs representing a backward reaching node group (S302).

The posture update section 56 then confirms whether or not the n is the node 42 having one child node 42 (S303).

In a case of confirming that the n is the node 42 having one child node 42 (S303: Y), the posture update section 56 updates the n to the child node 42 of the n (S304) and returns to the processing illustrated in S302.

In a case of confirming that the n is not the node 42 having one child node 42 (S303: N), the posture update section 56 executes the backward reaching phase processing of the FABRIK described with respect to FIG. 5 on each of the nodes 42 contained in the BNs (S305). It is noted here that the posture update section 56 does not execute the backward reaching phase processing in a case in which the number of nodes 42 contained in the BNs is one.

The posture update section 56 then confirms whether or not the n is the node 42 having two or more child nodes 42 (S306).

In a case of confirming that the n is the node 42 having two or more child nodes 42 (S306: Y), the posture update section 56 executes root transform processing (S307).

The root transform processing illustrated in S307 refers to, for example, processing for updating postures of part of the nodes 42 included in the skeleton model 40. In the case in which the n is the node 42 having two or more child nodes 42, the n is the node 42 that is the junction included in the skeleton model 40. For example, the postures of part of the nodes 42 may be updated here in such a manner that positions and directions of a plurality of nodes including the node 42 that is the junction match relative positions and relative directions in the basic posture.

For example, postures of the third spine node 42i, the left clavicle node 42k, and the right clavicle node 42n may be updated here on the basis of the third spine node 42i. For example, a rotation of the left upper arm node 42l based on the basic posture about an axis that is the bone 44c connecting the third spine node 42i to the second spine node 42h may be identified, on the basis of a position of the left upper arm node 42l. Further, for example, a rotation of the right upper arm node 42o based on the basic posture about the axis that is the bone 44c may be identified on the basis of a position of the right upper arm node 42o. The postures of the third spine node 42i, the left clavicle node 42k, and the right clavicle node 42n may be then updated by executing spherical linear interpolation by a quaternion on the basis of the two rotations identified in this way. Likewise, the postures of the pelvis node 42*f*, the left femoral region node 42*q*, and the right femoral region node 42*t* may also be updated on the basis of the pelvis node 42*f*.

The initial position determination section 54 then determines initial positions of some of the nodes 42 included in the skeleton model 40 (S308). For example, it is assumed that the postures of the third spine node 42*i*, the left clavicle node 42*k*, and the right clavicle node 42*n* are updated in the processing illustrated in S307. In this case, the initial positions of the right upper arm node 42*o*, the left upper arm node 42*l*, the neck node 42*j*, and the second spine node 42*h* are determined on the basis of the updated postures of these nodes 42 and the basic posture of the skeleton model 40. The initial positions of these nodes 42 may be determined here in such a manner that the positions or the directions of these nodes 42 are based on the third spine node 42*i* that is the sub-root node in the basic posture. It is also assumed, for example, that the postures of the pelvis node 42*f*, the left femoral region node 42*q*, and the right femoral region node 42*t* are updated in the processing illustrated in S307. In this case, the initial position of the first spine node 42*g* may be determined on the basis of the updated postures of these nodes 42 and the basic posture of the skeleton model 40. For example, the initial position of the first spine node 42*g* may be determined in such a manner that the position or the direction of the first spine node 42*g* is based on the pelvis node 42*f* that is the sub-root node in the basic posture.

The processing in and after S301 is recursively, repeatedly executed on each of all elements nci that are child nodes 42 of the n with each nci set as a next sub-root node (S309).

In a case in which it is confirmed that the n is not the node 42 having two or more child nodes 42 in the processing illustrated in S306 (S306: N), the processing illustrated in S309 on the sub-root node is ended. In other words, in a case in which the sub-root node is a terminal node 42 in the skeleton model 40 on which the processing illustrated in S301 to S309 is executed, the processing illustrated in S309 on the sub-root node is ended.

When the element nci on which the processing illustrated in S309 is executed is not present any more, the processing illustrated in S106 is ended.

In the processing illustrated in S106, the backward reaching phase processing is executed, for example, on the pelvis node 42*f*, the left femoral region node 42*q*, the left calf node 42*r*, and the left foot node 42*d*.

In addition, the backward reaching phase processing is executed on the pelvis node 42*f*, the right femoral region node 42*t*, the right calf node 42*u*, and the right foot node 42*e*.

Further, the backward reaching phase processing is executed on the pelvis node 42*f*, the first spine node 42*g*, the second spine node 42*h*, and the third spine node 42*i*.

Further, the backward reaching phase processing is executed on the third spine node 42*i*, the neck node 42*j*, and the head node 42*a*.

Further, the backward reaching phase processing is executed on the third spine node 42*i*, the left clavicle node 42*k*, the left upper arm node 42*l*, the left front arm node 42*m*, and the left hand node 42*b*.

Further, the backward reaching phase processing is executed on the third spine node 42*i*, the right clavicle node 42*n*, the right upper arm node 42*o*, the right front arm node 42*p*, and the right hand node 42*c*.

When the processing illustrated in S106 is ended, the posture update section 56 confirms whether or not an error in the positions of the target nodes is equal to or smaller than a predetermined threshold (S107). The posture update section 56 confirms here, for example, whether or not a sum of lengths between the positions of the nodes 42 and the positions to which the nodes 42 are to move and which are identified on the basis of the measurement results of the trackers 12 is equal to or smaller than the predetermined threshold.

In a case in which the error in the positions of the target nodes is not equal to or smaller than the predetermined threshold (S107: N), the posture update section 56 executes processing similar to the processing illustrated in S105 (S108). The posture update section 56 then executes processing similar to the processing illustrated in S106 (S109). The posture update section 56 then returns to the processing illustrated in S107. In the processing illustrated in S108 and S109, the lists described above may be reused.

In a case of confirming that the error in the positions of the target nodes is equal to or smaller than the predetermined threshold in the processing illustrated in S107 (S107: Y), the posture update section 56 updates postures of posture-undetermined nodes 42 (S110). It is noted that in a case in which the processing illustrated in S108 and the processing illustrated in S109 are executed a predetermined number of times, the processing illustrated in S110 may be executed even if the error in the positions of the target nodes is not equal to or smaller than the predetermined threshold.

In the processing illustrated in S110, the postures of, for example, the left thenar node 42*s* and the right thenar node 42*v* are updated. In this case, the posture of the left thenar node 42*s* may be updated in such a manner that a relative posture of the left thenar node 42*s* based on the posture of the left foot node 42*d* matches the relative posture in the basic posture. In addition, the posture of the right thenar node 42*v* may be updated in such a manner that a relative posture of the right thenar node 42*v* based on the posture of the right foot node 42*e* matches the relative posture in the basic posture.

The posture update section 56 then updates the directions of the bones 44 and the rotations of the nodes 42 (S111) and returns to the processing illustrated in S101. The posture update section 56 then executes the processing illustrated in S101 to S111 on the basis of posture data indicating the positions and the directions of the trackers 12 at newly acquired latest specific timing. In this way, the processing illustrated in S101 to S111 is repeatedly executed.

For example, the directions of the bones 44 can uniquely be identified here on the basis of the positions of the nodes 42 on both ends of each of the bones 44. However, it is impossible to identify the rotation about an axis that is each bone 44 from the positions of the nodes 42 on both ends of the bone 44.

Figure 12:
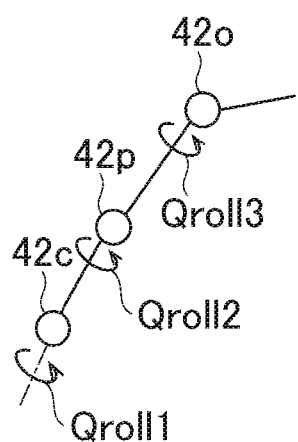
FIG. 12 is an explanatory diagram of an example of determination of a rotation of a node.

In the processing illustrated in S111, therefore, the posture update section 56 separates the rotation of each of the trackers 12*b* and 12*c* indicated by the posture data into, for example, a component of a bend of the wrist with respect to the arm, a component of a rotation of the arm with respect to the basic posture, and a component of a rotation about an axis in the direction of the arm. In FIG. 12, a component of a rotation of the right hand node 42*c* about an axis in a direction along the bone 44*m* is denoted as Qroll1.

The posture update section 56 then determines the rotations of the upper arm and the front arm on the basis of the rotation about the axis in the direction of the arm. The posture update section 56 determines here, for example, a component of a rotation of the right hand node 42*c* about the axis that is the bone 44*m*, as a rotation Qroll2 of the right front arm node 42*p* about the axis in the direction of the arm and a rotation Qroll3 of the right upper arm node 42*o* about the axis in the direction of the arm. Likewise, the posture update section 56 determines a component of a rotation of the left hand node 42b about an axis that is the bone 44i, as rotations of the left front arm node 42m and the left upper arm node 42l about an axis in the direction of the arm.

For example, an upper limit of 60 degrees or the like may be set in advance to a difference between the Qroll1 and the Qroll2 and a difference between the Qroll2 and the Qroll3. Further, a value obtained by multiplying a value of the Qroll1 by a predetermined coefficient equal to or smaller than 1 may be set as a value of the Qroll2. Further, a value obtained by multiplying the value of the Qroll2 by a predetermined coefficient equal to or smaller than 1 may be set as a value of the Qroll3.

As described so far, in the present embodiment, in the processing illustrated in S101, the posture data acquisition section 52 acquires, for example, the posture data indicating the posture of each target node included in the skeleton model 40 of the tree structure. In the processing illustrated in S104, the initial position determination section 54 then determines the position to which the target node is to move on the basis of the posture data. In the processing illustrated in S104, the initial position determination section 54 then determines the initial position of the parent node 42 of the target node in the FABRIK computing on the basis of the position to which the target node is to move and a given posture of the skeleton model 40. Further, in the processing illustrated in S308, the initial position determination section 54 determines the initial positions of some of the nodes 42 on the basis of the position to which the target node is to move and the given posture of the skeleton model 40.

In the example described above, for example, the position apart from the position T2 to which the right hand node 42c is to move by the length d1 in the opposite direction to the direction A2 along the direction A2 corresponds to the given posture for the initial position of the right front arm node 42p. Further, for example, the position apart from the position T3 by the length d4 in the direction rotated at the predetermined angle (for example, 90 degrees) about the axis in the transverse direction with the direction A3 set as the reference direction corresponds to the given posture for the initial position of the right calf node 42u.

Further, a given position and a given direction based on the root node in the basic posture correspond to the given posture for the initial positions of the right upper arm node 42o, the left upper arm node 42l, the neck node 42j, the second spine node 42h, and the first spine node 42g.

Further, in the processing illustrated in S105 to S111, the posture update section 56 executes the FABRIK computing including determination of a new position of the parent node 42 of each target node on the basis of the position to which the target node is to move and the initial position of the parent node 42. As a result, the posture of the skeleton model 40 is updated.

In this way, according to the present embodiment, a probability decreases in the determination of the posture by using the FABRIK computing that joints are not bent in natural directions and the posture of the skeleton model 40 which is impossible as that of the human body and lacks adequacy is sometimes determined. As a result, it is possible to improve adequacy of a determination result of the posture of the skeleton model 40.

Further, in the present embodiment, in the processing illustrated in S101, the posture data acquisition section 52 acquires, for example, the posture data indicating the posture of each target node included in the skeleton model 40 of the tree structure. In the processing illustrated in S102 to S109, the posture update section 56 then updates the posture of the skeleton model 40 by executing the FABRIK computing including the determination of the new position of the parent node 42 of the target node. In the processing illustrated in S111, the posture update section 56 then identifies the rotation of the target node about an axis that is the bone 44 connecting the target node to the parent node 42 of the target node on the basis of the posture data. In the processing illustrated in S111, the posture update section 56 then determines the rotation of the parent node 42 of the target node on the basis of the rotation of the target node.

In this way, according to the present embodiment, it is possible to perform the determination of the rotation about an axis in the arm direction based on the measurement results of each tracker 12. As a result, it is possible to improve the adequacy of the determination result of the posture of the skeleton model 40.

Further, in the present embodiment, in the processing illustrated in S101, the posture data acquisition section 52 acquires, for example, posture data indicating a posture of a first target node included in the skeleton model 40 of the tree structure and postures of a plurality of nodes 42 including a second target node.

In the processing illustrated in S207, the posture update section 56 then updates postures of a first node group containing nodes including the first target node and connected to one another by the forward reaching phase processing in the FABRIK computing on the basis of the posture data. In addition, in the same processing illustrated in S207, the posture update section 56 updates postures of a second node group containing nodes including the second target node and connected to one another by the forward reaching phase processing in the FABRIK computing.

In the processing illustrated in S307, the posture update section 56 then updates the postures of the plurality of nodes 42 after updating the first node group and the second node group. The plurality of nodes 42 include, for example, here the nodes 42 included in the first node group and closest to the junctions included in the skeleton model 40 and the nodes 42 included in the second node group and closest to the junctions included in the skeleton model 40.

Further, in the processing illustrated in S304, the posture update section 56 updates the posture of the skeleton model 40 by the backward reaching phase processing in the FABRIK computing.

In this way, in the present embodiment, it is possible to prevent overall postures of a plurality of nodes in the vicinity of junctions of the skeleton model 40 of the tree structure, for example, from the chest to the shoulders from getting greatly distorted although the overall postures are not supposed to get greatly distorted. As a result, it is possible to improve the adequacy of the determination result of the posture of the skeleton model 40.

It is noted that the present invention is not limited to the embodiment described above.

For example, an applicable range of the present invention is not limited to the update of the posture of the skeleton model 40 in real time according to actual motions of the trackers 12. The present invention may be applied to, for example, a scene for reproducing the skeleton model 40 or a state in which a player object according to the skeleton model 40 moves, on the basis of time series of a series of pieces of posture data that is recorded in the entertainment apparatus 14 in advance.

Further, the tracker 12a, for example, may be a head mounted display (HMD). In this case, a video picture according to a result of various types of processing such as game processing according to the positions or the directions of the plurality of regions included in the user may be displayed on, for example, a display section of the HMD.

Further, part of or entirety of the functions depicted in FIG. 6 may be implemented by the trackers 12.

Further, in the game processing according to the present embodiment, a collision sometimes occurs between, for example, a player object corresponding to the skeleton model 40 and the other object such as an obstacle which is, for example, a wall or the other player object.

At a time of occurrence of such a collision, the entertainment system 10 according to the present embodiment updates the posture of the skeleton model 40 by executing IK computing taking into account of an influence of the collision.

A first implementation example of the IK computing taking into account of the influence of the collision that occurs will be described hereinafter.

In the first implementation example, the initial position determination section 54 monitors occurrence of the collision described above in the game processing. During this monitoring, the processing illustrated in S101 to S112 described above is repeatedly executed.

At a time of detecting the occurrence of the collision, the initial position determination section 54 then identifies a position to which one or each of a plurality of nodes to which the collision occurs is to move according to the influence of the collision. The one or each of the plurality of nodes to which the collision occurs will be referred to as "dynamic effector node," hereinafter. The initial position determination section 54 identifies here, for example, physical quantities such as a position, a posture, a speed, an acceleration, an angular speed, a force, and an impulsive force of one or each of the dynamic effector nodes made to correspond to the influence of the collision. The initial position determination section 54 then identifies the position to which the one or each of the dynamic effector nodes is to move by executing physical simulation processing based on the physical quantities.

The posture of the skeleton model 40 is then updated by executing the FABRIK computing on the basis of the position to which the one or each of the dynamic effector nodes is to move. For example, upon further setting the position to which the one or each of the dynamic effector nodes is to move described above as the initial position in the processing illustrated in S104, the processing illustrated in S105 to S112 is executed here.

For example, a node 42 that is the target node may be the dynamic effector node here. In this case, a position obtained by interpolating the position to which the node 42 is to move and which is based on the posture data generated by the tracker 12 and the position to which the node 42 is to move according to the influence of the collision may be set as the initial position of the node 42. A weight according to the influence of the collision may be identified here. Then, the interpolation described above may be performed by the weight.

Further, a node 42 on which the root transform processing described above is executed, for example, may be the dynamic effector node. In this case, the initial positions in consideration of the influence of the collision may be set for not only the node 42 but also the node 42 the posture of which is updated together with the former node 42 by the root transform processing.

A second implementation example of the IK computing taking into account of the influence of the collision that occurs will be described hereinafter.

Similarly to the first implementation example, in the second implementation example, the initial position determination section 54 monitors occurrence of the collision described above in the game processing. During this monitoring, the processing illustrated in S101 to S112 described above is repeatedly executed.

At the time of detecting occurrence of the collision, the initial position determination section 54 then identifies a position to which the one or each of the dynamic effector nodes is to move. The initial position determination section 54 then sets the position to which the one or each of the dynamic effector nodes is to move as the initial position of the one or each of the dynamic effector nodes.

The posture update section 46 then updates the posture of the skeleton model 40 by executing the FABRIK computing including the forward reaching phase processing in the FABRIK computing divided by the one or each of the dynamic effector nodes. It is assumed, for example, that the right front arm node 42p is the dynamic effector node. In this case, the forward reaching phase processing is executed on the right hand node 42c and the right front arm node 42p and the forward reaching phase processing is then executed on the right front arm node 42p, the right upper arm node 42o, and the right clavicle node 42n.

Further, likewise, in the backward reaching phase processing, the backward reaching phase processing may be executed on the right front arm node 42p, the right upper arm node 42o, and the right clavicle node 42n, and the forward reaching phase processing may be then executed on the right hand node 42c and the right front arm node 42p. It is noted that in a case in which the node 42 the initial position of which is determined in the processing illustrated in S308 is the dynamic effector node, the processing for determining the initial position illustrated in S308 may not be executed on the node 42.

For example, a right finger node 42 is sometimes provided in front of the right hand node 42c in the skeleton model 40. In addition, in such a case, a collision sometimes occurs, for example, that a finger of the player object touches an object of a desk. In this case, the right finger node 42 is a dynamic effector node. For example, in such a case, the FABRIK computing divided by the right hand node 42c may be executed. In this case, it is possible to prevent the finger of the player object from sinking into the object of the desk. In this way, in the second implementation example, the FABRIK computing divided by the target node may be executed.

It is noted that in the second implementation example, the posture of the skeleton model 40 may be updated by executing the IK computing other than the FABRIK computing divided by the one or each of the plurality of dynamic effector nodes.

A third implementation example of the IK computing taking into account of the influence of the collision will be described hereinafter.

Similarly to the first and second implementation examples, in the third implementation example, the initial position determination section 54 monitors occurrence of the collision described above in the game processing. During this monitoring, the processing illustrated in S101 to S112 described above is repeatedly executed.

At the time of detecting occurrence of the collision, the initial position determination section 54 then identifies a position to which the one or each of the dynamic effector nodes is to move. The initial position determination section 54 then sets the position to which the one or each of the dynamic effector nodes is to move as the initial position of the one or each of the dynamic effector nodes.

In the third implementation example, the processing illustrated in S101 to S112 is then executed. Subsequently, the posture update section 56 then executes the backward reaching phase processing with the one or each of the dynamic effector nodes set as a root node. In a case in which a plurality of dynamic effector nodes are present here, the backward reaching phase processing with each of the dynamic effector nodes set as a root node is sequentially executed.

It is noted that in the third implementation example, the posture of the skeleton model 40 may be updated by executing another IK computing other than the backward reaching phase processing with the one or each of the dynamic effector nodes set as a root node after executing the processing illustrated in S101 to S112.

As described so far, in the IK computing taking into account of the influence of the collision that occurs, the initial position determination section 54 normally identifies the position to which the target node that is the one or each of the plurality of given nodes 42 included in the skeleton model 40 is to move. The posture update section 56 then updates the posture of the skeleton model 40 by executing the FABRIK computing on the basis of the position to which the one or each of the target nodes is to move. Here, the number of target nodes is not always two or more but may be one.

At the time of occurrence of a collision to the one or the plurality of dynamic effector nodes, the posture update section 56 then updates the posture of the skeleton model 40 by executing the FABRIK computing taking into account of the influence of the collision on the one or the plurality of dynamic effector nodes.

In the first implementation example here, the posture update section 56 updates the posture of the skeleton model 40 by executing the FABRIK computing with the position to which the one or each of the plurality of dynamic effector nodes is to move according to the collision that occurs set as the initial position. The first implementation example is suitable, for example, in a situation in which the posture of each tracker 12 takes precedence over the influence of the collision that occurs such as a case of occurrence of a light collision with an object.

Further, in the second implementation example, the posture update section 56 updates the posture of the skeleton model 40 by executing the IK computing divided by each of the one or the plurality of dynamic effector nodes. The second implementation example is suited, for example, in a situation in which a priority of the influence of the collision that occurs is equal to a priority of the posture of each tracker 12 such as a case of occurrence of a collision with an object of a wall.

Further, in the third implementation example, the posture update section 56 updates the posture of the skeleton model 40 by further executing another IK computing with the one or each of the plurality of dynamic effector nodes set as a root node after the above-described update based on the position to which the one or each of the plurality of target nodes is to move. The third implementation example is suited, for example, in a situation in which the influence of the collision that occurs takes precedence over the posture of each tracker 12 such as a case of occurrence of a heavy collision with an object.

It is noted that the dynamic effector node is sometimes influenced by the collision over some long time. In a scene, for example, in which an object such as a ball strikes on the player object, an impulsive force sometimes influences the dynamic effector node over some long time. In such a scene, the FABRIK computing taking into account of the occurrence of the collision described so far may be continuously executed for the time for which the dynamic effector node is influenced by the collision.

Further, the posture of the skeleton model 40 may be updated by executing any of the processing in the first implementation example, the processing in the second implementation example, and the processing in the third implementation example, according to a property of the collision that occurs. It is assumed, for example, that a collision occurs between the other object and the player object. In this case, the processing in the first implementation example may be executed in a case in which a weight corresponding to the other object is smaller than a predetermined weight, and the processing in the third implementation example may be executed in a case in which the weight is greater than the predetermined weight. Further, for example, the processing in the second implementation example may be executed in a case of occurrence of a collision between a predetermined object such as a wall, a table, or a floor and the player object.

Further, the entertainment apparatus 14 according to the present embodiment may further include a display control section that displays, on a display section, a video picture after the posture of the skeleton model 40 is updated by executing the IK computing taking into account of the influence of the collision on the one or each of the dynamic effector nodes. In addition, the display control section may display, on a display section, a video picture according to, for example, at least one of the position and the direction of the head node 42a after the update. Further, in a case in which the tracker 12a is a head mounted display (HMD), the display control section may display, on a display section of the HMD, a video picture according to at least one of the position and the direction of the head node 42a after the update. The display control section may be implemented mainly in the control section 30 and the input/output section 36. Further, part of or entirety of functions of the display control section may be implemented by the trackers 12.

Further, at the time of occurrence of a collision to the one or each of the dynamic effector nodes, the posture update section 46 may execute the IK computing taking into account of the influence of the collision on the one or each of the dynamic effector nodes other than the FABRIK computing.

Further, the IK computing taking into account of the influence of occurrence of the collision described above may be executed in a scene other than the game such as a scene of producing an animation. For example, the above-described IK computing may be executed at a time of generating an animation representing a state in which the player object according to the skeleton model 40 moves on the basis of time series of a series of pieces of posture data or motion data recorded in the entertainment apparatus 14 in advance.

Executing processing for reflecting the influence of a collision in the posture of the skeleton model 40 as an alternative to the IK computing or regardless of a result of the IK computing at the time of occurrence of the collision sometimes causes an unnatural motion of the skeleton model 40. Executing here the IK computing taking into account of the influence of the collision on the dynamic effector node as described so far makes it possible to provide a natural motion of the skeleton model 40 at the time of occurrence of the collision.

It is noted that the present invention is not limited to the embodiment described above.

Further, specific character strings and numeric values described above and specific character strings and numeric values in the drawings are given as an example and the present invention is not limited to these character strings and numeric values.

The invention claimed is:

1. A skeleton model update apparatus comprising:
a position identification section that identifies a position to which one or each of a plurality of given nodes included in a skeleton model is to move; and
a posture update section that updates a posture of the skeleton model by executing inverse kinematics computing on a basis of the position to which the one or each of the plurality of given nodes is to move, wherein,
at a time of occurrence of a collision to one or a plurality of nodes included in the skeleton model, the posture update section updates the posture of the skeleton model by executing the inverse kinematics computing taking into account of an influence of the collision on the one or the plurality of nodes, including by executing the inverse kinematics computing divided by the one or each of the plurality of nodes to which the collision occurs, and
the posture update section updates the posture of the skeleton model by executing another inverse kinematics computing with the one or each of the plurality of nodes to which the collision occurs set as a root node after updating the posture of the skeleton model by executing the inverse kinematics computing on the basis of the position to which the one or each of the plurality of given nodes is to move.

2. The skeleton model update apparatus according to claim 1, wherein the posture update section updates the posture of the skeleton model by executing the inverse kinematics computing on a basis of a position to which the one or each of the plurality of nodes to which the collision occurs is to move according to the influence of the collision.

3. The skeleton model update apparatus according to claim 2, wherein the posture update section updates the posture of the skeleton model by executing the inverse kinematics computing with the position to which the one or each of the plurality of nodes to which the collision occurs is to move according to the influence of the collision set as an initial position.

4. The skeleton model update apparatus according to claim 1, wherein the posture update section updates the posture of the skeleton model by executing, according to a property of the collision, any of the inverse kinematics computing with the position to which the one or each of the plurality of nodes to which the collision occurs is to move according to the influence of the collision as an initial position, the inverse kinematics computing divided by the one or each of the plurality of nodes to which the collision occurs, and processing that includes update of the posture of the skeleton model by executing the inverse kinematics computing on the basis of the position to which the one or each of the plurality of given nodes is to move and another inverse kinematics computing after the update with the one or each of the plurality of nodes to which the collision occurs set as a root node.

5. The skeleton model update apparatus according to claim 1, further comprising:

a display control section that displays, on a display section, a video picture according to at least one of a position and a direction of a node corresponding to a head of a user and included in the skeleton model after the posture of the skeleton model is updated by executing the inverse kinematics computing taking into account of the influence of the collision on the one or the plurality of nodes to which the collision occurs.

6. The skeleton model update apparatus according to claim 5, wherein the display control section displays the video picture on a display section of a head mounted display.

7. A skeleton model update method comprising:
identifying a position to which one or each of a plurality of given nodes included in a skeleton model is to move; and
updating a posture of the skeleton model by executing inverse kinematics computing on a basis of the position to which the one or each of the plurality of given nodes is to move,
wherein, at a time of occurrence of a collision to one or a plurality of nodes included in the skeleton model, the posture of the skeleton model is updated by executing the inverse kinematics computing taking into account of an influence of the collision on the one or the plurality of nodes in the updating the posture, including by executing the inverse kinematics computing divided by the one or each of the plurality of nodes to which the collision occurs, and
the updating includes updating the posture of the skeleton model by executing another inverse kinematics computing with the one or each of the plurality of nodes to which the collision occurs set as a root node after updating the posture of the skeleton model by executing the inverse kinematics computing on the basis of the position to which the one or each of the plurality of given nodes is to move.

8. A non-transitory, computer readable storage medium containing a program, which when executed by a computer, causes the computer to carry out actions, comprising:
identifying a position to which one or each of a plurality of given nodes included in a skeleton model is to move; and
updating a posture of the skeleton model by executing inverse kinematics computing on a basis of the position to which the one or each of the plurality of given nodes is to move,
wherein, at a time of occurrence of a collision to one or a plurality of nodes included in the skeleton model, the posture of the skeleton model is updated by executing the inverse kinematics computing taking into account of an influence of the collision on the one or the plurality of nodes in the updating the posture, including by executing the inverse kinematics computing divided by the one or each of the plurality of nodes to which the collision occurs, and
the updating includes updating the posture of the skeleton model by executing another inverse kinematics computing with the one or each of the plurality of nodes to which the collision occurs set as a root node after updating the posture of the skeleton model by executing the inverse kinematics computing on the basis of the position to which the one or each of the plurality of given nodes is to move.

* * * * *